UNITED STATES PATENT OFFICE.

ROY C. DAVIDSON, OF FORT BLACKMORE, VIRGINIA.

PROCESS FOR WELDING COPPER.

1,013,134.   Specification of Letters Patent.   Patented Jan. 2, 1912.

No Drawing.   Application filed November 19, 1910. Serial No. 593,249.

*To all whom it may concern:*

Be it known that I, ROY C. DAVIDSON, a citizen of the United States, residing at Fort Blackmore, in the county of Scott and State of Virginia, have invented certain new and useful Improvements in Processes for Welding Copper, of which the following is a specification.

This invention relates to the art of welding copper and has for its object to provide a very simple and extremely efficient method or process whereby two pieces of copper of any form may be quickly welded together to produce what is, in effect, a single piece of metal.

With this object in view, the invention consists in an improved process for welding copper, the successive steps of which will be hereinafter made manifest so that any one, even though unfamiliar with the art may successfully weld together several pieces of copper.

It has heretofore been found exceedingly difficult, if not altogether impossible, to successfully weld copper, as iron and other metals are welded, so that a satisfactory and lasting union of the two pieces is effected. By means of my process, I have overcome the difficulties heretofore existing in this art, said process consisting of several simple steps which when properly performed will eventuate into a perfect weld of the copper pieces.

In carrying out my process, I first place the two pieces of copper, which are to be welded in an open forge, such as blacksmiths use, or other fire and allow it to remain therein until it assumes a dull red or bluish color. The copper pieces are now withdrawn from the fire and a quantity of borax is placed upon the metal at the meeting surfaces of the two pieces and they are again placed back in the fire. After becoming sufficiently heated, the copper pieces are removed and hammered to closely engage the surfaces thereof, and it is then once more returned to the forge fire. When the copper pieces have been for a third time sufficiently heated, they are removed and a quantity of ferrous sulfate is placed upon the engaged ends of the copper pieces. After placing the ferrous sulfate upon the copper the pieces are placed in the forge fire and when highly heated are removed and hammered together with a suitable sledge. The weld is now completed and it will be found that the ferrous sulfate which is last applied closely unites the two copper pieces and effectively overcomes all liability of their separation under the maximum strain which they may be expected to sustain.

By means of my improved welding process as above set forth, I am enabled to weld together copper in an ordinary blacksmith's forge and with the use of the simple tools which are employed in the commonly known process for welding iron. It will be obvious that the pieces may be heated to a greater or less degree so that they will become rapidly pliable under the blows of the sledge.

Having thus described the invention what is claimed is:—

The herein described process for welding copper which consists in first placing the pieces to be welded together and inserting the same into a fire, then withdrawing the same after they have been heated and placing thereon at their meeting surfaces a quantity of borax, then again inserting the pieces into the fire to be heated and once more removing the same and hammering them together, then returning the pieces to be welded to the fire to be again heated, then removing them and placing upon the connected ends of the pieces a quantity of ferrous sulfate, then placing the pieces back in the fire until they are highly heated, and lastly removing the pieces from the fire and hammering them together to form the completed weld.

In testimony whereof I hereunto affix my signature in the presence of two witnesses.

ROY C. DAVIDSON.

Witnesses:
C. H. HAWKINS,
J. M. TAYLOR.